United States Patent
Ikeuchi et al.

(10) Patent No.: US 12,475,019 B2
(45) Date of Patent: Nov. 18, 2025

(54) SYSTEM STATE ESTIMATION APPARATUS, SYSTEM STATE ESTIMATION METHOD AND PROGRAM

(71) Applicant: NTT, Inc., Tokyo (JP)

(72) Inventors: Hiroki Ikeuchi, Tokyo (JP); Akio Watanabe, Tokyo (JP); Takehiro Kawata, Tokyo (JP)

(73) Assignee: NTT, Inc., Tokyo (JP)

( * ) Notice: Subject to any disclaimer, the term of this patent is extended or adjusted under 35 U.S.C. 154(b) by 749 days.

(21) Appl. No.: 16/973,093

(22) PCT Filed: Jun. 13, 2019

(86) PCT No.: PCT/JP2019/023539
§ 371 (c)(1),
(2) Date: Dec. 8, 2020

(87) PCT Pub. No.: WO2019/240229
PCT Pub. Date: Dec. 19, 2019

(65) Prior Publication Data
US 2021/0255945 A1    Aug. 19, 2021

(30) Foreign Application Priority Data
Jun. 14, 2018    (JP) .................................. 2018-113872

(51) Int. Cl.
*G06F 11/34*    (2006.01)
*G06F 11/07*    (2006.01)
(Continued)

(52) U.S. Cl.
CPC .......... *G06F 11/3476* (2013.01); *G06F 11/07* (2013.01); *G06F 11/3438* (2013.01); *G06N 7/00* (2013.01); *G06N 20/00* (2019.01)

(58) Field of Classification Search
CPC .......... G06N 7/01; G06F 17/17; G06F 17/18; G06F 11/3438; G06F 11/079; G06F 11/0751; G06F 11/0754; G06F 11/757
See application file for complete search history.

(56) References Cited

U.S. PATENT DOCUMENTS 10,396,919 B1 *    8/2019    O'Shea ............... H04L 25/0254
11,023,816 B2 *    6/2021    Cogill ................. G06Q 10/0635
(Continued)

OTHER PUBLICATIONS

Ikeuchi et al., "Examination of failure factor estimation technology using logs caused by user behavior," B-7-18, IEICE General Conference, 2018, 4 pages (with English Translation).
(Continued)

*Primary Examiner* — Jacob D Dascomb
*Assistant Examiner* — Kevin X Lu
(74) *Attorney, Agent, or Firm* — Fish & Richardson P.C.

(57) ABSTRACT

A system state estimation apparatus to estimate a system state in a system that outputs log data upon executing a user action, the system state estimation apparatus includes a memory; and a processor configured to execute using log data accumulated in advance, to generate a stochastic model in which a system state and a user action are associated with log data when the user action is executed in the system state; and determining a user action that contributes to identification of the system state in the system, based on a probability distribution of the system state and the stochastic model.

5 Claims, 7 Drawing Sheets

(51) Int. Cl.
 *G06N 7/00* (2023.01)
 *G06N 20/00* (2019.01)

(56) References Cited

U.S. PATENT DOCUMENTS

| | | | | |
|---|---|---|---|---|
| 2010/0293134 | A1* | 11/2010 | Von Sydow | G06N 7/01 706/55 |
| 2012/0269436 | A1* | 10/2012 | Mensink | G06V 10/764 382/180 |
| 2013/0259445 | A1* | 10/2013 | Suzuki | H04N 9/8227 386/241 |
| 2016/0217022 | A1* | 7/2016 | Velipasaoglu | G06F 11/0709 |
| 2018/0020622 | A1* | 1/2018 | Richt | G06Q 10/04 703/6 |
| 2018/0113773 | A1* | 4/2018 | Krishnan | G06N 5/022 |
| 2018/0121601 | A1* | 5/2018 | Hahm | G16B 30/10 |
| 2018/0136995 | A1* | 5/2018 | Sheppard | G06N 7/01 |
| 2018/0285186 | A1* | 10/2018 | Godefroid | G06F 11/3604 |
| 2018/0314573 | A1* | 11/2018 | Chang | G06N 20/00 |
| 2019/0051174 | A1* | 2/2019 | Haque | G08G 1/202 |
| 2019/0317817 | A1* | 10/2019 | Brown | G06F 9/5077 |
| 2020/0322361 | A1* | 10/2020 | Ravindra | G06F 40/279 |
| 2021/0034500 | A1* | 2/2021 | Budnik | G06N 3/08 |

OTHER PUBLICATIONS

Joshi et al., "Probabilistic Model-Driven Recovery in Distributed Systems," IEEE Transaction on Dependable and Secure Computing, 2011, 8(6):913-928.

Kaelbling et al., "Planning and acting in partially observable stochastic domains," Artificial Intelligence, 1998, 101(1-2):99-134.

Kavulya et al., "Failure Diagnosis of Complex Systems," Resilience Assessment and Evaluation of Computing Systems, Springer, 2012, pp. 239-261.

Kimura et al., "Proactive Failure Detection Learning Generation Patterns of Large-scale Network Logs," Proc. of the 11th International Conference on Network and Service Management (CNSM), 2015, pp. 8-14.

Littman et al., "An Instance-based State Representation for Network Repair," Proc. of the 19th National Conference on American Association for Artificial Intelligence (AAAI), 2004, pp. 287-292.

Sutton et al., "Reinforcement Learning," Morikita Publishing, 2000, pp. 159-161, 4 pages (English Translation by Sadayoshi Mikami, Masaaki Minagawa).

\* cited by examiner

Jun 19 14:00:00 proc01 DEBUG [req-12345] accepted ( IPv4, 12345) server /*/*/***
Jun 19 14:00:01 proc02 INFO [req-56789] Get http://***
Jun 19 14:00:03 proc01 DEBUG [req-24680] Failed to fetch instance by id server1 get /*/*
Jun 19 14:00:03 proc01 DEBUG [req-13579] Returning 404 to user: Could not find instance ***
Jun 19 14:00:03 proc01 DEBUG [req-98765] HTTP exception thrown: Could not find instance ***
Jun 19 14:00:04 proc01 DEBUG [req-43210] Returning 404 to user: Could not find instance ***

ID ASSIGNMENT

SEQUENCE OF LOG ID NUMBERS CONSISTING OF SIX LOG IDS (ACTION LOG)   $L_{sa}^{(k)} = [1,2,4,5,7,5]$

FIG.4

SEQUENCE OF LOG ID
NUMBERS CONSISTING
OF SIX LOG IDS $$L_{sa}^{(k)} = [1,2,4,5,7,5]$$

FEATURE-VECTORIZATION $$x_{sa}^{(k)} = (1,1,0,1,1,0,1,0)$$

SYSTEM STATE ESTIMATION APPARATUS, SYSTEM STATE ESTIMATION METHOD AND PROGRAM

CROSS-REFERENCE TO RELATED APPLICATIONS

This application is a National Stage application under 35 U.S.C. § 371 of International Application No. PCT/JP2019/023539, having an International Filing Date of Jun. 13, 2019, which claims priority to Japanese Application Serial No. 2018-113872, filed on Jun. 14, 2018. The disclosure of the prior application is considered part of the disclosure of this application, and is incorporated in its entirety into this application.

TECHNICAL FIELD

The present invention relates to techniques for estimating the system state in a system that outputs logs in response to user actions.

BACKGROUND ART

In recent years, communication systems, which have rapidly increased in scale, are constituted with thousands or tens of thousands of devices, in which diverse types of failures occur; therefore, it takes an extremely large amount of time to deal with failures. In particular, the isolation work to find out the causes of failures poses a significant workload on the operators; therefore, demand for automated mechanisms has been growing.

In general, information included in system logs output by devices (hereafter, simply referred to as the logs) is often used for identifying the cause of a failure. Normally, a huge amount of logs are output to an extent that it is difficult to manually check the logs; therefore, techniques have been developed for automating analysis. In many conventional techniques, machine-learning techniques that take as input a huge amount of observed log data are adopted to obtain causal relationships between events, and/or to generate rules to associate log data with causes of failures, so as to automate and expedite identification of causes of failures (Non-patent document 1).

However, many of such techniques are based on logs that are obtained passively through periodic monitoring of devices (hereafter, referred to as monitoring logs); therefore, there has been a problem that failures cannot be isolated for which similar types of logs are output for different causes.

Thereupon, a method has been developed in which in order to identify the cause of a failure, not only monitoring logs are used, but also logs output as results of actively executed actions by the system administrator (these will be referred to as action logs), such as "virtual machine startup" and "volume deletion" which are normally executed by system users (these will be referred to as user actions), are used (Non-patent document 2).

The technique disclosed in Non-patent document 2 takes advantage of a fact that even though no differences appear in the monitoring logs for different causes of failures, differences may appear in the action logs. The method of Non-patent document 2 comprehensively stores in advance action logs for various user actions upon various failures in a testbed environment system or a real environment system before operation; and when a failure occurs on the real environment system under operation, the administrator (automatically) executes all user actions comprehensively to collect and analyze the action logs so as to identify the cause of the failure.

From the viewpoint of obtaining information by executing some actions initiated by the administrator, there have been techniques to automate and expedite the identification of the cause by prioritizing conceivably effective actions to be selected and executed (Non-patent documents 3 and 4). In Non-patent documents 3 and 4, the system returns feedback in response to an action initiated by the administrator, and depending on the feedback, the administrator determines a next action to be taken, which allows the administrator to execute appropriate actions in an appropriate order, and to identify the cause quickly. However, these methods are targeted on actions for isolation in operation management, such as the ping command, not on user actions; in particular, the feedback is limited to simple ones that take binary values, such as "ping communication success" and "ping communication failure".

RELATED ART DOCUMENTS

Non-Patent Documents

[Non-patent document 1] S. P. Kavulya, K. Joshi, F. D. Giandomenico, and P. Narasimhan, "Failure diagnosis of complex systems", Resilience assessment and evaluation of computing systems, Springer, pp. 239-261, 2012.

[Non-patent document 2] Hiroki Ikeuchi, Akio Watanabe, Takehiro Kawata, and Ryoichi Kawahara, "Examination of failure factor estimation technology using logs caused by user behavior", B-7-18, IEICE General Conference, 2018.

[Non-patent document 3] K. R. Joshi, M. A. Hiltunen, W. H. Sanders, and R. D. Schlichting, "Probabilistic model-driven recovery in distributed systems", IEEE Transaction on Dependable and Secure Computing, vol. 8, no. 6, pp. 913-928, 2011.

[Non-patent document 4] M. L. Littman, N. Ravi, E. Fenson, and R. Howard, "An Instance-based State Representation for Network Repair", in Proc. of the 19th National Conference on American Association for Artificial Intelligence (AAAI), pp. 287-292, 2004.

SUMMARY OF INVENTION

Problem to be Solved by the Invention

The technique disclosed in Non-patent document 2 needs to collect logs by executing user actions comprehensively on a faulty real environment system when identifying the actual cause of a failure. However, these actions may pose a significant load on the real environment system, and there is a risk of deteriorating the system state. Also, for example, in the case of a cloud system, the types of user actions can be at least several dozens, and it takes a long time to execute all of these actions to collect logs, which may result in prolonged identification of the cause of a failure. Therefore, when identifying the cause of a failure as in Non-patent document 2, a mechanism is required to execute appropriate user actions in an appropriate order.

Although the techniques disclosed in Non-patent documents 3 and 4 are related to solutions of similar problems of selecting actions, these cannot be applied to situations where the system returns complex feedback in response to actions executed by the administrator, such as log data that cannot be represented in binary values.

The present invention has been made in view of the above, and has an object to provide techniques with which it is possible to execute appropriate user actions in an appropriate order when identifying the system state using user actions.

Means for Solving the Problem

According to the disclosed techniques, a system state estimation apparatus to estimate a system state in a system that outputs log data upon executing a user action is provided, which includes a model generation unit configured to use log data accumulated in advance, to generate a stochastic model in which a system state and a user action are associated with log data when the user action is executed in the system state; and an action determination unit configured to determine a user action that contributes to identification of the system state in the system, based on a probability distribution of the system state and the stochastic model.

Advantage of the Invention

According to the disclosed techniques, techniques with which it is possible to execute appropriate user actions in an appropriate order when identifying the system state using user actions, are provided.

EMBODIMENTS OF THE INVENTION

In the following, an embodiment according to the present invention (the present embodiment) will be described. Although the embodiment described below includes examples in the case of applying the present invention to identification of the cause of a failure in a system, the present invention can be applied not only to identification of the cause of a failure in a system, but also to identification of other system states.

Overview of Embodiment

In the present embodiment, in system operation, the cause of a failure occurring in a communication system is to be automatically identified. In particular, for failures that are difficult to isolate because no differences are found in regular monitoring logs alone, by using logs that are output in response to user actions, it becomes possible to identify the cause of a failure faster and with less processing load on the system than conventional techniques.

As will be described later, a failure cause estimation device 10 is used. The failure cause estimation device 10 uses log data in a training data accumulation unit in which log data is accumulated in association with all user actions in normal and faulty operations, to generate a model in which a system state and a user action are associated with log data that is likely to appear at that time. Also, the failure cause estimation device 10 collects observed log data from the system under operation, and using the model, determines effective user actions for isolating the system state, and executes the user actions to obtain new observed log data as the feedback, so as to narrow down candidates for the cause of the failure sequentially.

In order to determine which user actions are effective for isolating the system state, the failure cause estimation device 10 uses the above model, for example, based on the logs obtained from the on-line system, to calculate and select a user action that is most likely to narrow down the candidates for the cause of the failure, on all such occasions.

Also, in order to determine which user actions are effective for isolating the system state, on a system that returns non-numerical feedback such as a log for an action, the failure cause estimation device 10 may simulate problems of identifying causes in the above model, and execute various actions, to learn in advance a policy for determining an appropriate user action to be executed when isolating failures on-line, so as to select a user action according to the policy when isolating failures on-line.

(Device Configuration and Operation Overview)

Figure 1:
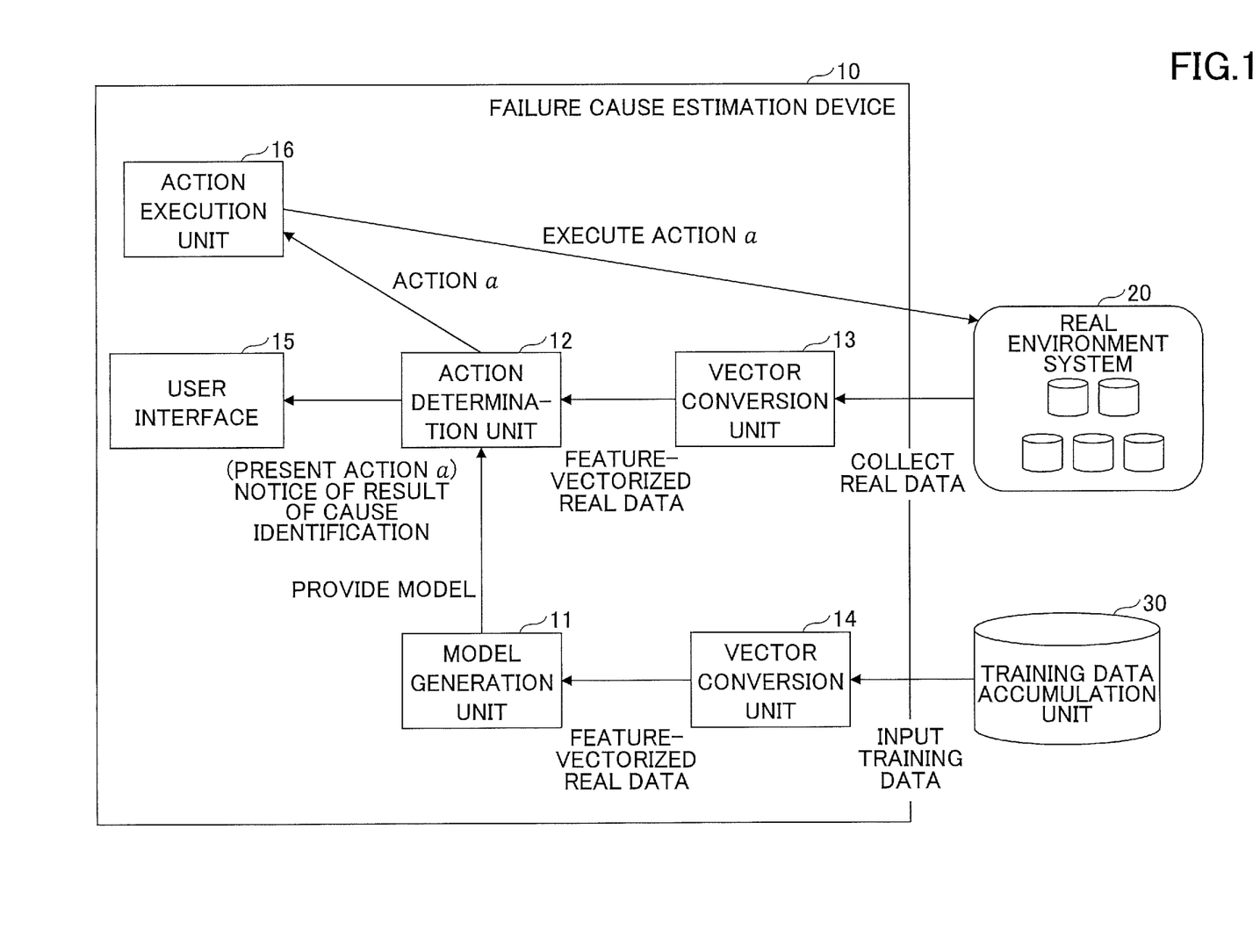
FIG. 1 is a functional configuration diagram of a failure cause estimation device 10.

FIG. 1 illustrates an example of a functional configuration of the failure cause estimation device 10 in the embodiment according to the present invention. As illustrated in FIG. 1, the failure cause estimation device 10 includes a model generation unit 11, an action determination unit 12, vector conversion units 13 and 14, a user interface 15, and an action execution unit 16. Also, as illustrated, the failure cause estimation device 10 is communicably connected with a real environment system 20 and a training data accumulation unit 30. Note that the model generation unit 11 may include the vector conversion unit 14, and the action determination unit 12 may include the vector conversion unit 13. Also, the failure cause estimation device 10 is a device for estimating the system state, and hence, may be referred to as a system state estimation apparatus. The overview of its operations is as follows.

The training data accumulation unit 30 stores action log data upon failures generated by the techniques disclosed in Non-patent document 2, as training data. The vector conversion unit 14 obtains the training data from the training data accumulation unit 30, and feature-vectorizes the training data. The model generation unit 11 generates a model from the feature-vectorized training data.

The vector conversion unit 13 collects log data from the real environment system 20 on-line, to feature-vectorize the real data. The action determination unit 12 determines which action is to be executed next, based on the model generated by the model generation unit 11 and the (feature-vectorized) log data obtained on-line from the real environment system 20. The user interface 15 issues a notice of the action to be executed and the result of cause identification, to a user such as an operator. The action execution unit 16 executes the action determined by the action determination unit 12 on the real environment system 20.

Based on the feature-vectorized training data, the model generation unit 11 generates a model of what feature vectors (corresponding to logs) are likely to be obtained when a certain action is taken upon a certain failure. With the model generated here, it becomes possible, for example, to numerically calculate a value corresponding to the probability of taking a certain user action upon a certain failure when a log is obtained from the real environment system 20. This model is used in the action determination unit 12.

The action determination unit 12 first defines a probability distribution for each candidate for the cause of a failure; and based on the probability distribution, determines a user action to be executed based on a predetermined algorithm. The determined user action is executed by the action execution unit 16. Next, the action determination unit 12 updates the probability distribution of the candidate for the cause of the failure, based on feature-vectorized logs obtained as the feedback. The action determination unit 12 determines the next user action based on the updated probability distribution, and executes the action.

By repeating the above process, the action determination unit 12 finally narrows down the candidates for the cause of the failure to a unique one, to accomplish the identification of the cause. Thanks to such consideration of the sequence of user actions and selective execution, it is possible to accomplish the identification of the cause with fewer user actions than with the techniques of Non-patent document 2 that execute all user actions.

The failure cause estimation device 10 described above can be implemented, for example, by having a computer execute a program that describes the process described in the present embodiment.

In other words, the failure cause estimation device 10 can be implemented by executing a program corresponding to the processing executed on the failure cause estimation device 10 using hardware resources such as a CPU and a memory built in the computer. The program can be recorded on a computer-readable recording medium (a portable memory, etc.), to be stored and/or distributed. Also, it is also possible to provide the program described above via a network such as the Internet or e-mail.

Figure 2:
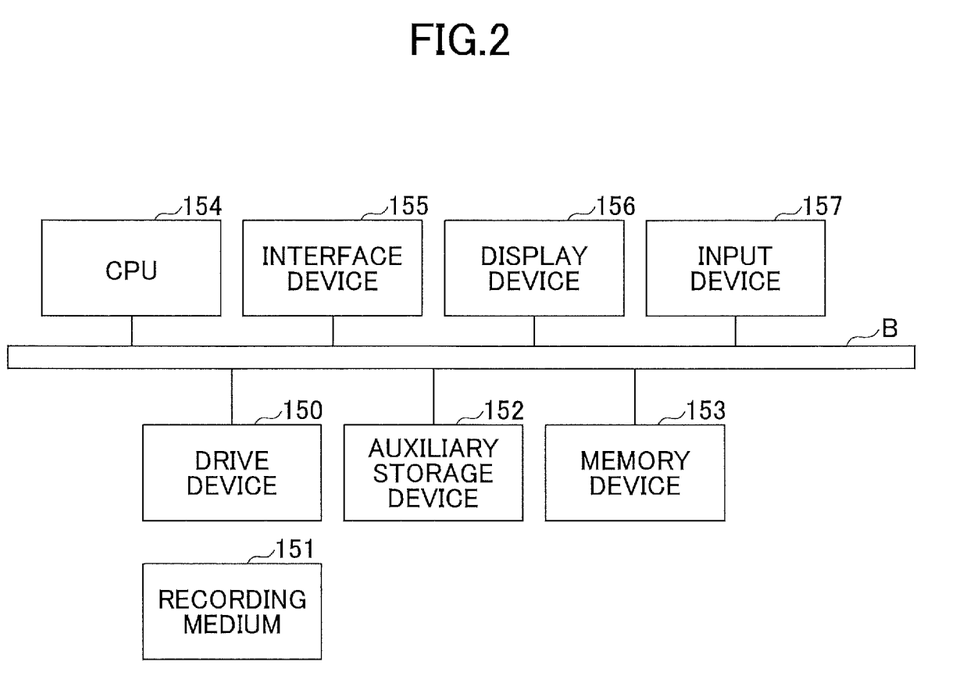
FIG. 2 is a diagram illustrating an example of a hardware configuration of the failure cause estimation device 10.

FIG. 2 is a diagram illustrating an example of the hardware configuration of a computer in the present embodiment. The computer in FIG. 2 includes a drive device 150, an auxiliary storage device 152, a memory device 153, a CPU 154, an interface device 155, a display device 156, an input device 157, and the like, which are connected to each other via a bus B.

The program for implementing the processing on the computer is provided by a recording medium 151, for example, a CD-ROM or memory card. When the recording medium 151 on which the program is stored is set in the drive device 150, the program is installed in the auxiliary storage device 152, from the recording medium 151 via the drive device 150. However, installation of the program does not need to be executed necessarily with the recording medium 151, and may be downloaded from another computer via the network. The auxiliary storage device 152 stores the installed program, and also stores necessary files, data, and the like.

The memory device 153 reads and stores the program from the auxiliary storage device 152 in response to an activation command of the program. The CPU 154 implements the functions associated with the device according to the program stored in the memory device 153. The interface device 155 is used as an interface for connecting to the network. The display device 156 displays a GUI (Graphical User Interface) generated by the program, and the like. The input device 157 is constituted with a keyboard, a mouse, buttons, a touch panel, or the like, to be used for inputting various operating commands.

(Detailed Description of Respective Units)

In the following, the main functional units of the configuration described above will be described in more detail. In the following, first, accumulated data in the training data accumulation unit 30 based on the techniques of Non-patent document 2 will be outlined, and then, the model generation unit 11 and the action determination unit 12 will be described in more detail. In particular, as for the processing contents of the action determination unit 12, two implementation schemes of "minimum entropy method" and "reinforcement learning-based method" will be described.

(Training Data Accumulation Unit 30)

First, the definitions of several terms used in the present Description will be described. A "system state s" represents a type of failure of a system, which is equated with the cause of a failure that the operator wants to identify. A set of system states S is denoted as $S=\{0, 1, \ldots, m\}$. For example, in a situation where at most one process has terminated abnormally, if it is desired to identify a process terminated abnormally (including whether such a process exists), states may be defined such as s=0 as a normal state (no failure is occurring), and $s \in S - \{0\}$ as a state where the s-th process has terminated abnormally. A "user action a" refers to an action that can be initiated by the user when using the system.

For example, considering IaaS cloud services, which are examples suitable for applying the present invention, "starting a virtual machine (VM)", "logging in a VM by ssh", and the like correspond to user actions. A set of user actions is denoted as $A=\{0, 1, \ldots, n\}$. In particular, $a_0$ is assumed to represent that no action is to be taken.

An "action log" is a sequence of log messages generated when a user action a is taken in a system state s. For example, by using a log-templating technique of Reference 1 (T. Kimura, A. Watanabe, T. Toyono, and K. Ishibashi, "Proactive failure detection learning generation patterns of large-scale network logs", in Proc. of the 11th International Conference on Network and Service Management (CNSM), pp. 8-14, 2015) to assign the same ID number to similar types of log messages and different ID numbers to different types of log messages, an action log can be regarded as a sequence of ID numbers. This is denoted as $L_{sa}$. There are m+1 types (|S|=m+1) of s and n+1 types of a (|A|=n+1); therefore, there are (m+1) (n+1) types of action logs $\{L_{sa} | s \in S, a \in A\}$.

The techniques disclosed in Non-patent document 2 take into consideration a situation where these (m+1) (n+1) types of action logs are stored in a database in a testbed environment system or in a real environment system before operation. Note that $L_{s0}$ that corresponds to a=0 is a log that is generated when no action is taken; therefore, and it can be regarded as a monitoring log. In other words, under this definition, the action logs include a monitoring log.

It is conceivable that the action log $L_{sa}$ fluctuates little by little upon each trial. Thereupon, in the present embodiment, it is assumed that a situation where for each (s, a), $L_{sa}$ is accumulated as multiple samples $L_{sa}^{(1)}, L_{sa}^{(2)}, \ldots, L_{sa}^{(k)}$ (where K is the number of trials), instead of a single sample.

Figure 3:
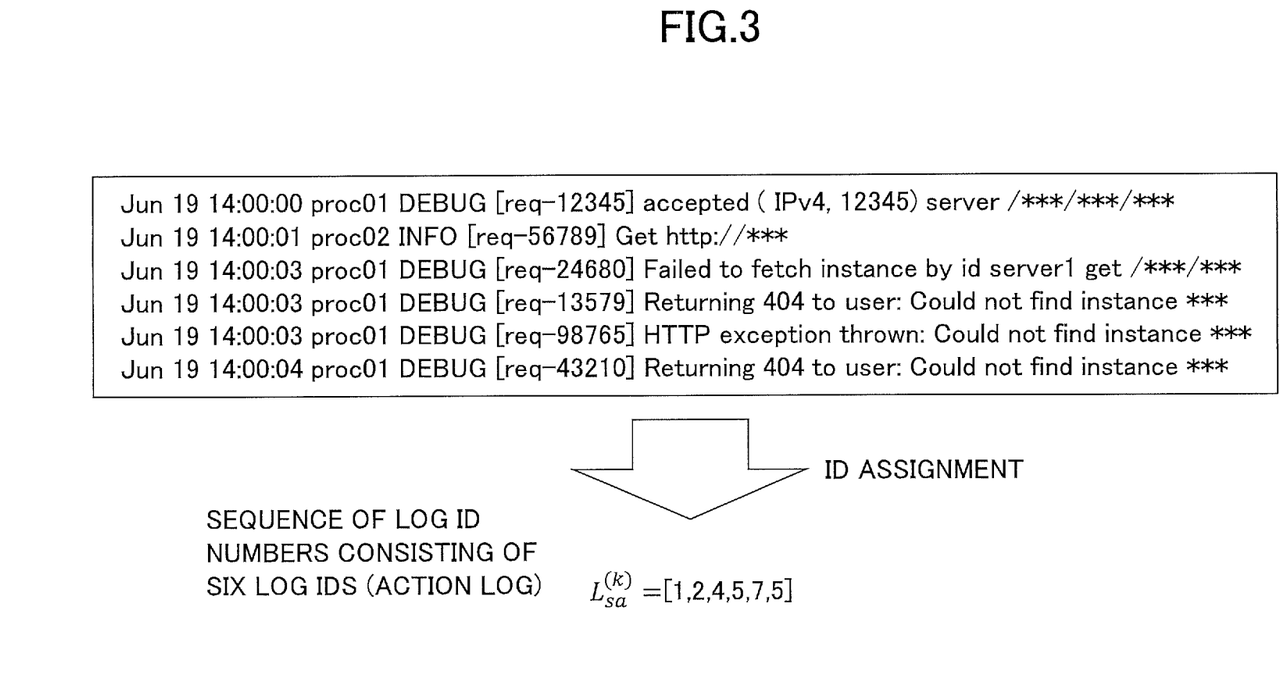
FIG. 3 is a diagram illustrating assignment of IDs to a sequence of log messages.

FIG. 3 illustrates a sequence of log messages consisting of six log messages as an example of the ID number assignment to a sequence of log messages. Assume that the sequence of log messages is generated when a user action a is executed in a system state s. As illustrated in FIG. 3, the sequence of log ID numbers is generated as $L_{sa}^{(k)}=[1, 2, 4, 5, 7, 5]$.

Note that in this example, the fourth and sixth log messages have the same ID number 5 because the type is the same although the parameters (req-13579 and req-43210) are different. Also, this example is a sequence created by extracting part of action logs obtained in a cloud environment in a state s of VM-related processes being stopped when a VM start command is executed as an action a, and processing the process names and parameters.

(Model Generation Unit 11)

Next, the model generation unit 11 will be described. Processing by the model generation unit 11 is executed in advance off-line, following the accumulation of the training data described above. The role of the model generation unit 11 is to systematically process action logs stored in the training data accumulation unit 30, and to build a model that is required in practice in the action determination unit 12 involved in the cause identification. The model generation is executed with steps of "<Step 101> feature-vectorization of action logs", "<Step 102> generation of representative vectors", and "<Step 103> generation of a stochastic model". Step 101 below is executed by the vector conversion unit 14, and Steps 102 and 103 are executed by the model generation unit 11.

<Step 101> Feature-Vectorization of Action Logs

For each (s, a), each sample $L_{sa}^{(k)}$ (k=1, 2, ..., K) in action logs stored in the training data accumulation unit 30 as training data is converted into a feature vector $x_{sa}^{(k)}$ (k=1, 2, ..., K). Although the conversion method can be determined discretionarily, here, as an example, a sequence of feature amounts each indicating whether each log ID has appeared or not is set as the feature vector. In other words, denoting all log IDs as 1, 2, ..., and N, $x_{sa}^{(k)}$ is an N-dimensional vector, and each element is set as $x_{sa,i}^{(k)}=1$ if a log ID number i appears in $L_{sa}^{(k)}$, or $x_{sa,i}^{(k)}=0$ if not appearing, where $x_{sa,i}^{(k)}$ is the i-th element of the N-dimensional vector $x_{sa}^{(k)}$.

Figure 4:
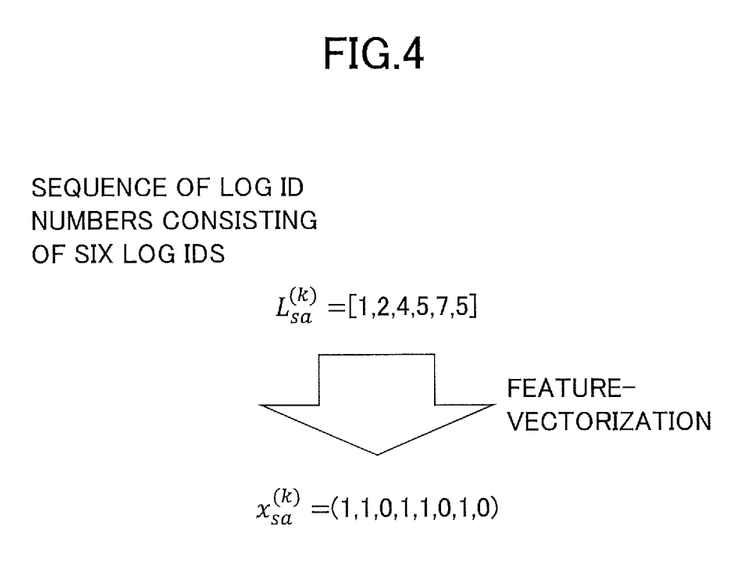
FIG. 4 is a diagram illustrating feature-vectorization of a sequence of log ID numbers.

An example of feature vectorization is illustrated in FIG. 4. FIG. 4 illustrates an example in which the sequence of log ID numbers illustrated in FIG. 3 is converted to a feature vector. Note that here, the maximum value of the log ID number is set as N=8. As the ID numbers 1, 2, 4, 5, and 7 appear in $L_{sa}^{(k)}$, the first, second, fourth, fifth, and seventh elements of $x_{sa}^{(k)}$ are set to 1; and as the ID numbers 3, 6, and 8 do not appear in $L_{sa}^{(k)}$, the third, sixth, and eighth elements of $x_{sa}^{(k)}$ are set to 0.

<Step 102> Generation of Representative Vectors

Next, by using the feature vectors $x_{sa}^{(k)}$ (k=1, 2, ..., K), a representative vector $\wedge x_{sa}$ for each (s, a) is generated one by one. Note that for the sake of convenience of notation, in the text in the present Description, a prefix $\wedge$ is attached before a character such as "$\wedge$x", instead of being attached over the character. Each element of the representative vector is calculated by the following formula.

$$\hat{x}_{sa,i} = \frac{\sum_{k=1}^{K} x_{sa,i}^{(k)} + \alpha}{K + \alpha + \beta} \quad [\text{Formula 1}]$$

where α and β are optional positive parameters called the number of valid observations. Here, $\wedge x_{sa}$ can be regarded as a vector representing the probability of appearance of each log ID when the user action a is executed in the system state s based on previous samples.

<Step 103> Generation of a Stochastic Model

Next, by using the representative vectors $\wedge x_{sa}$, under given (s, a) (i.e., the user action a has been executed in the system state s), a stochastic model is generated that represents likelihood of which feature vectors (corresponding to action logs) tend to appear. Although the stochastic model can be given discretionarily, as an example here, the Bernoulli distribution is used with an assumption that under given (s, a), each log ID appears independently from the others. In other words, under given (s, a), the probability $P_a(x|s)$ of observing a feature vector $x \in \{0, 1\}^N$ is calculated as follows:

$$P_a(x|s) = \prod_{i=1}^{N} p_a(x_i|s) = \prod_{i=1}^{N} \hat{x}_{sa,i}^{x_i}(1 - \hat{x}_{sa,i})^{1-x_i} \quad [\text{Formula 2}]$$

(Action Determination Unit 12)

Next, the action determination unit 12 will be described. Note that for the sake of convenience of notation, in the text in the present Description, a prefix ~ is attached before a character such as "~s", instead of being attached over the character.

The action determination unit 12 operates on-line when identifying the cause of a failure on the real environment system. More specifically, triggered by a separate technique of anomaly detection (any existing technique may be used), a user report, or the like, the action determination unit 12 starts operating after some anomaly is found in the real environment system. The (unknown) system state at this time is denoted as ~s.

Figure 5:
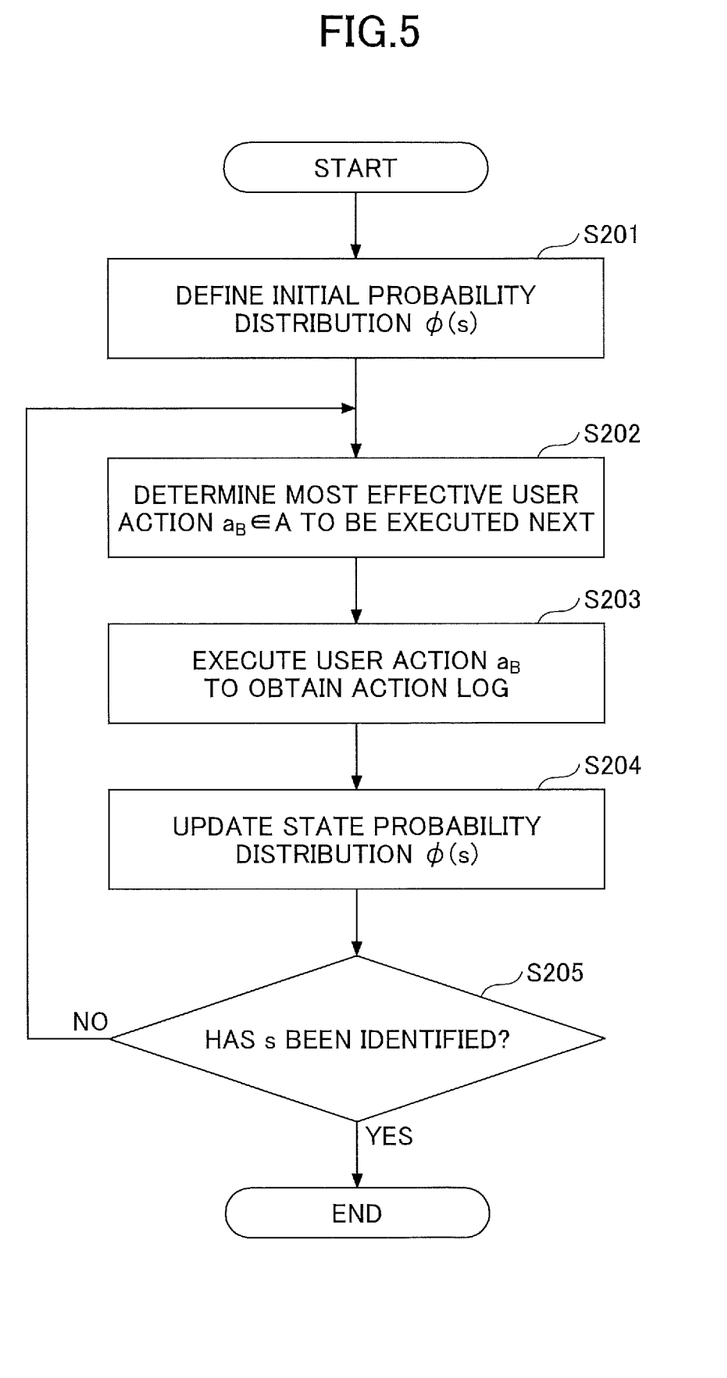
FIG. 5 is a flow chart of processing executed by an action determination unit 12.

The role of the action determination unit 12 is to identify the cause with as few a number of processing steps as possible, and thereby, to narrow down possible causes of a failure in a real environment system in which the system state ~s is unknown, based on action logs obtained from execution of user actions (feature-vectorized as $x \in \{0, 1\}^N$) and the stochastic model generated by the model generation unit 11, namely, to select and execute user actions so as to identify ~s. The action determination unit 12 executes the following procedure of Steps 201 to 205. FIG. 5 is a flow chart of the procedure.

<Step 201>

First, an initial probability distribution φ(s) (s∈S) to represent candidates for the system state is defined (0≤φ(s) ≤1 for ∀s∈ S, $\Sigma_{s \in S} \varphi(s)=1$). This represents a probability that the real environment system is in a system state s∈ S. Such an initial probability distribution can be defined discretionarily, for example, defined as a uniform distribution; defined depending on the past failure frequency; or defined using conventional techniques based on information obtained only from the monitoring logs. The action determination unit 12 may store the initial probability distribution φ(s) in advance, or may calculate the initial probability distribution φ(s) at a timing when the action determination unit 12 starts its operations.

<Step 202>

Next, the action determination unit 12 takes the state probability distribution φ(s) and the stochastic model $P_a(x|s)$ as input, and based on a "policy", outputs a most effective user action $a_B \in A$ to be executed next. The "policy" will be described in more detail later.

<Step 203>

The user action $a_B$ determined by the action determination unit 12 is executed by the action execution unit 16 to obtain an action log. Note that the execution of the user action $a_B$ may be performed by an operator (a person) who received a notice of the user action $a_B$ through the user interface 15. A feature vector vectorized from this action log in substantially the same way as in the model generation unit 11 is expressed as follows:

[Formula 3]

The action determination unit 12 obtains the feature vector.

<Step 204>

Based on the observed feature vector

[Formula 4]

$\tilde{y}\tilde{s}a_B$ and the stochastic model $P_a(x|s)$, the action determination unit 12 updates the state probability distribution $\varphi(s)$ based on an "update formula": $\varphi(s) \Theta \varphi'(s)$. The "update formula" will be described in detail later.

<Step 205>

Under the updated state probability distribution $\varphi'(s)$, if the value for a certain $s \in S$ is higher than a certain threshold value, the action determination unit 12 outputs this s as the result of cause estimation. In the case of setting the threshold value to be greater than 0.5, the state to be output may be one of 0 to m; however, in the case of setting the threshold value to be less than or equal to 0.5, multiple values of s may be output. Having output s, the action determination unit 12 completes its operations. If there is no corresponding s, the process from Step 202 is repeated using the updated state probability distribution $\varphi'(s)$. Note that s output from the action determination unit 12 is presented to the operator, for example, through the user interface 15.

In the present embodiment, as executed at Step 204, by updating the state probability distribution using a feature-vectorized action log of an executed user action, non-binary feedback is reflected in the next action to be executed. Also, in contrast to the techniques disclosed in Non-patent document 2 that execute all of the n+1 types of user actions, in the present embodiment, by calculating an appropriate order of actions based on a stochastic model, the loop of Steps 202 to 205 is terminated as quickly as possible to limit the number of user actions to be small, so as to reduce the processing load on the system.

In the following, the "policy" at Step 202 and the "update formula" at Step 204 mentioned earlier will be described in detail. Here, as the implementation schemes of these, two methods will be described, which are the "minimum entropy method" and the "reinforcement learning-based method". By implementing the "policy" and the "update formula" according to either one of the methods, the problem described above can be solved. Note that the solution is not limited to the "minimum entropy method" and the "reinforcement learning-based method", and it is possible to use a method other than these.

(Minimum Entropy Method)

<Minimum Entropy Method: Policy>

First, the "policy" in the case of using the minimum entropy method will be described.

This method uses a stochastic model to calculate and select a user action a that is expected to bias the state probability distribution $\varphi(s)$ to a certain $s \in S$ most significantly. As a result of execution of the user action, if the state probability distribution is actually biased significantly, the cause can be identified with a few loops (repetitions of Steps 202 to 205).

The degree of bias in the probability distribution $\varphi(s)$ can generally be expressed as entropy $I(\varphi(s)) = -\Sigma_s \varphi(s) \ln \varphi(s)$, and increasing the bias corresponds to decreasing the entropy; therefore, this method is referred to as the minimum entropy method. The details of this method are as follows.

The probability $P_a(x)$ of observing a feature vector x when executing a user action a is calculated as $P_a(x) = \Sigma_s P_a(x|s)\varphi(s)$, by using the state probability distribution $\varphi(s)$ and the stochastic model $P_a(x|s)$. If the feature vector x is obtained as a result of execution of the user action a, the posterior distribution of the state probability distribution $P_a(s|x)$ is obtained as $P_a(s|x) = P_a(x|s)\varphi(s)/P_a(x)$, by using Bayes' theorem. Here, a concept of "expected value of the entropy of the posterior distribution (EI)" is introduced, which is defined by the following formula:

$$EI(a) = \sum_x p_a(x) I(p_a(s|x)) \simeq \sum_s \phi(s) I(p_a(s'|x_{sa}^*)) \quad \text{[Formula 5]}$$

where s in the first formula and s' in the second formula are symbols that represent arguments of the probability distribution, and note that these are not variables that appear explicitly. According to the first formula (formula defining EI), EI(a) can be regarded as an expected value, calculated by using only the state probability distribution $\varphi(s)$ and the stochastic model $P_a(x|s)$, to represent to what extent the posterior distribution of the state probability distribution is biased when a user action a is taken. However, as implied with the term of $\Sigma_x$, this definition formula takes the sum of $2^N$ terms, and hence, the computational complexity is high; therefore, the second formula (an approximation of EI) that holds under certain conditions is used for calculation in practice.

Here, $x^*_{sa} = \arg\max_x P_a(x|s)$, which can be easily obtained as follows.

[Formula 6]

$x^*_{sa,i} = 1(x_{sa,i} \geq 0.5)$ or 0 (otherwise)

Meanwhile, the "policy" that determines a most effective user action $a_B \in A$ in this method is expressed by the following formula:

$$a_B = \arg\min_{a \in A-Done} EI(a) \quad \text{[Formula 7]}$$

where Done is a set of user actions that have already been executed in the previous loops. In other words, each user action from 0 to n is executed up to only once.

<Minimum Entropy Method: Update Formula>

In the case of using the minimum entropy method, the "update formula" is as follows.

When the following feature vector is obtained by executing a user action $a_B$,

[Formula 8]

$\tilde{Y}\tilde{s}a_B$ update of the state probability distribution denoted as $\varphi(s) \to \varphi'(s)$ is calculated by the following formula using Bayes' theorem.

[Formula 9]

$\phi'(s) = Pa_B(s|\tilde{y}\tilde{s}a_B) = pa_B(\tilde{y}\tilde{s}a_B|S)\phi(s)/Pa_B(\tilde{y}\tilde{s}a_B)$ (Reinforcement Learning-Based Method)

Next, the reinforcement learning-based method will be described. In general, a decision-making problem of "aiming to select and execute an action for which a higher reward is expected to be given, while estimating the state in a situation where a stochastic "observed value" and "reward" can be obtained as a result of executing a certain action, although the "state" itself cannot be observed", can be formulated as a partial observable Markov decision process (POMDP) (Reference 2: L. P. Kaelblinga, M. L. Littman, and A. R. Cassandra, "Planning and acting in partially observable stochastic domains", Artificial Intelligence, vol. 101, no. 1-2, pp. 99-134, 1998). The problem setting in the present embodiment can be reduced to the POMDP framework by specifying the system state s as the "state", the user action a as the "action", the feature-vectorized log $y_{sa}$ as the "observed value", and defining an appropriate function as the "reward". It is often the case that general POMDPs are difficult to solve due to the computational complexity; therefore, in the present embodiment, the "policy" and "update formula" are implemented upon simplifying the formulation according to the problem setting in the present embodiment.

<Reinforcement Learning-Based Method: Policy>

The "policy" in the case of using the reinforcement learning-based method will be described.

In a POMDP, a previously introduced state probability distribution $\varphi(s)$ is referred to as the belief state. A Q-function $Q(\varphi(s), a)$ is defined, which is a function of a belief state and an action. In general, the policy in a POMDP is to take an action a that maximizes the Q-function in the current belief state $\varphi(s)$, as expressed in the following formula.

$$a_B = \arg \max_a Q(\phi(s), a) \quad \text{[Formula 10]}$$

In the above formula, there are problems that (i) $\varphi(s)$ as an argument of the Q-function takes continuous values, and hence, is difficult to handle from the viewpoint of computational complexity, and (ii) how the Q-function should be obtained in the first place. In the following, solutions to (i) and (ii) will be described, which take the problem setting of the present embodiment into account.

Solution to (i):

Normally, this problem is avoided by discretizing $\varphi(s)$. Here, a set of candidate states B is introduced as follows: $B=\psi(\varphi(s))\equiv\{s\in S|\varphi(s)\geq q^*\}\in 2^S$, where $q^*\in[0,1]$ is an appropriate threshold value. In other words, from among $s\in S$, states having possibilities to take a certain probability of $q^*$ or greater are collected as B. This can reduce the infinite number of $\varphi(s)$ down to $2^{|S|}$ at most. In the following, as for the Q-function, Q(B, a) may be used instead of $Q(\varphi(s), a)$. Solution to (i):

Here, "policy learning" is performed in advance. Although various methods are available for this, here, a method conforming with Q-learning as a method of reinforcement learning (Reference 3: R. Sutton and A. Barto, "Reinforcement Learning" (translated in Japanese by Sadayoshi Mikami, Masaaki Minagawa), pp. 159-161, Morikita Publishing, 2000) will be described.

In the policy learning, a Q-function giving a maximum reward is obtained while trying out a variety of actions in advance. In the present embodiment, by using a stochastic model $P_a(x|s)$ generated in advance, a number of problems of identifying causes are generated by simulation, to perform the policy learning. The simulation of problems of identifying causes is executed as follows.

First, an appropriate $\sim s\in S$ is taken as a sample, which is set as a true state. Of course, this cannot be observed directly. Next, with a probability of 1-$\varepsilon$, an action a that maximizes Q(B, a) is executed, and with a probability of s, an action other than a is selected appropriately and executed. Here, as the value of Q(B, a) at the outset, an appropriate initial value may be given. Also, as the types of actions, in addition to the user actions $a\in A=\{0, 1, \ldots, n\}$, an end action a=n+1 is added. Depending on the taken action, the cause estimation proceeds as follows. If $a\in A=\{0, 1, \ldots, n\}$ is taken, then, the candidate states transition as follows,

[Formula 11]
$$B=\psi(\phi(s))\to B'=\psi(P_a(S|X^*_{\tilde{s}a}))$$

and a reward of R(B)=0 is received (i.e., no reward). If a=n+1 is taken, then, the cause identification ends; or if $|B|\geq 1$ and $\sim s\in B$, a reward of R(B)=1/|B| is received, otherwise, R(B)=0. This means that a=n+1 corresponds to an action of "checking the answer", and if the state of the correct answer is included in the candidate states, a higher reward is to be obtained for a smaller number of candidates while the narrowing-down process proceeds. Also, in any case of a, the Q-function Q(B, a) is updated according to the typical Q-learning update formula, which is Q(B, a)$\leftarrow$Q(B, a)+$\alpha$(R(B)+$\gamma$max$_a\cdot$Q(B, a')$-$Q(B, a)), where $\alpha$ and $\gamma$ are parameters called the learning rate and the discount rate, respectively. In this way, until the cause identification is completed (i.e., a=n+1 is taken), the simulation of the cause identification repeats selection and execution of actions. Once the cause identification is completed, the simulation is repeated with sampling a new $\sim s$.

The Q-learning theory guarantees that after the simulation is repeated for a number of times, the Q-function converges to an appropriate one. In the present case, thanks to the way of giving the reward function R(B) and the discount rate $\gamma\in(0,1)$, a policy is learned such that candidate states can be correctly narrowed down to a single state with as few actions as possible.

In summary, the "policy" according to the present method is given as follows. Using a Q-function Q(B, a) obtained after a sufficient number of repetitions of the simulation performed in advance for policy learning, at Step 202 in the on-line cause identification, an action is determined by the following formula:

$$a_B = \arg \max_{a\in A-Done} Q(B, a) \quad \text{[Formula 12]}$$

Here, the candidate states B are determined by the current state probability distribution (the belief state) $\varphi(s)$ as $B=\psi(\varphi(s))\equiv\{s\in S|\varphi(s)\geq q^*\}$. Also, as in the case of the minimum entropy method, an action once executed is recorded so as not to be executed twice or more.

<Reinforcement Learning-Based Method: Update Formula>

In the case of using the reinforcement learning-based method, the update formula is as follows.

The update of the state probability distribution $\varphi(s)$ follows the following formula in substantially the same way as in the minimum entropy method.

[Formula 13]
$$\phi'(s)=pa_B(s|y\tilde{s}a_B)=pa_B(y\tilde{s}a_B|S)\phi(s)/pa_B(y\tilde{s}a_B)$$

Therefore, the set of candidate states B is also updated at the same time by the following formula: $B=\psi(\varphi(s))\to B'=\psi(\varphi'(s))$.

In either case of the "minimum entropy method" or the "reinforcement learning-based method", if the cause is not identified even after having executed all user actions, namely, if $\varphi'(s)$ exceeding a given threshold value is not calculated even after having repeated Steps 202 to 205 for n+1 times, an error (identification failed) is output to end the process, or s having the highest probability is output to stop the process. Also, in the "reinforcement learning-based method", in the case where the number of elements in the set of state candidates B is narrowed down to one, the single state is output as the result of cause identification to stop the process, or in the case where the set of state candidates B becomes an empty set, an error is returned to end the process.

Application Examples

In the following, as an application example, a specific example of operations of the failure cause estimation device 10 will be described. The operations in the present application example include off-line preparatory operations and on-line cause identification operations.

Figure 6:
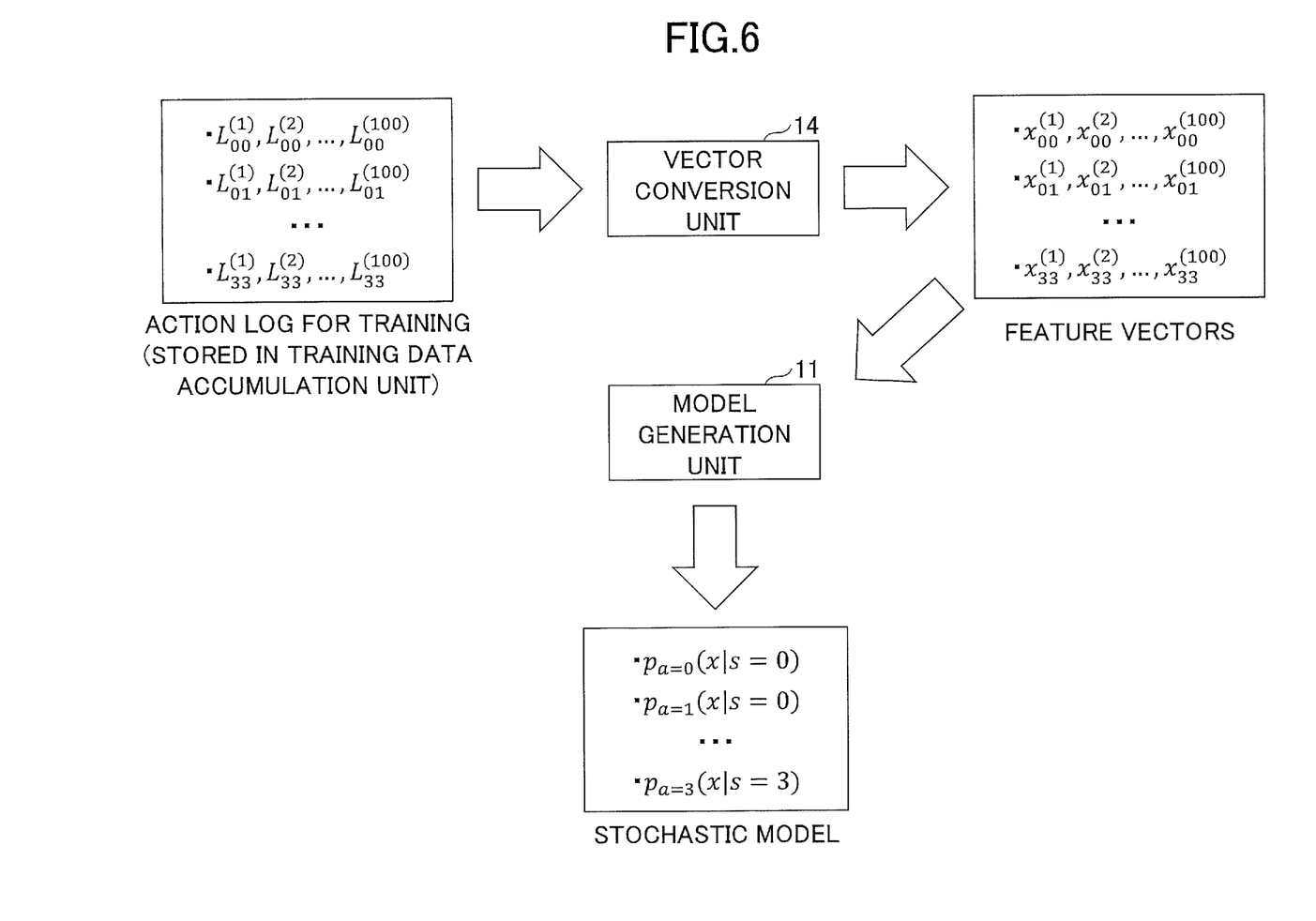
FIG. 6 is a diagram illustrating processing in an application example.

First, the stage of off-line preparation will be described with reference to FIG. 6. In the present application example, S={0, 1, 2, 3} and A={0, 1, 2, 3} are set, and the number of samples of $L_{sa}$ for each (s, a) is set to K=100.

Here, it is assumed that by using a testbed environment system or the real environment system 20 before operation, a sufficient number (K=100) of action logs are stored in the training data accumulation unit 30. As illustrated in FIG. 6, the failure cause estimation device 10 accesses the training data accumulation unit 30, to convert each item of training data $\{L_{sa}^{(k)}\}$ to a feature vector $\{x_{sa}^{(k)}\}$ by the vector conversion unit 14. These vectors are passed to the model generation unit 11, and the model generation unit 11 generates a stochastic model $P_a(x|s)$ by the method described above. The operations are executed off-line in advance. Note that here, the generated stochastic model $P_a(x|s)$ is input in advance into the action determination unit 12 to be used on-line.

Figure 7:
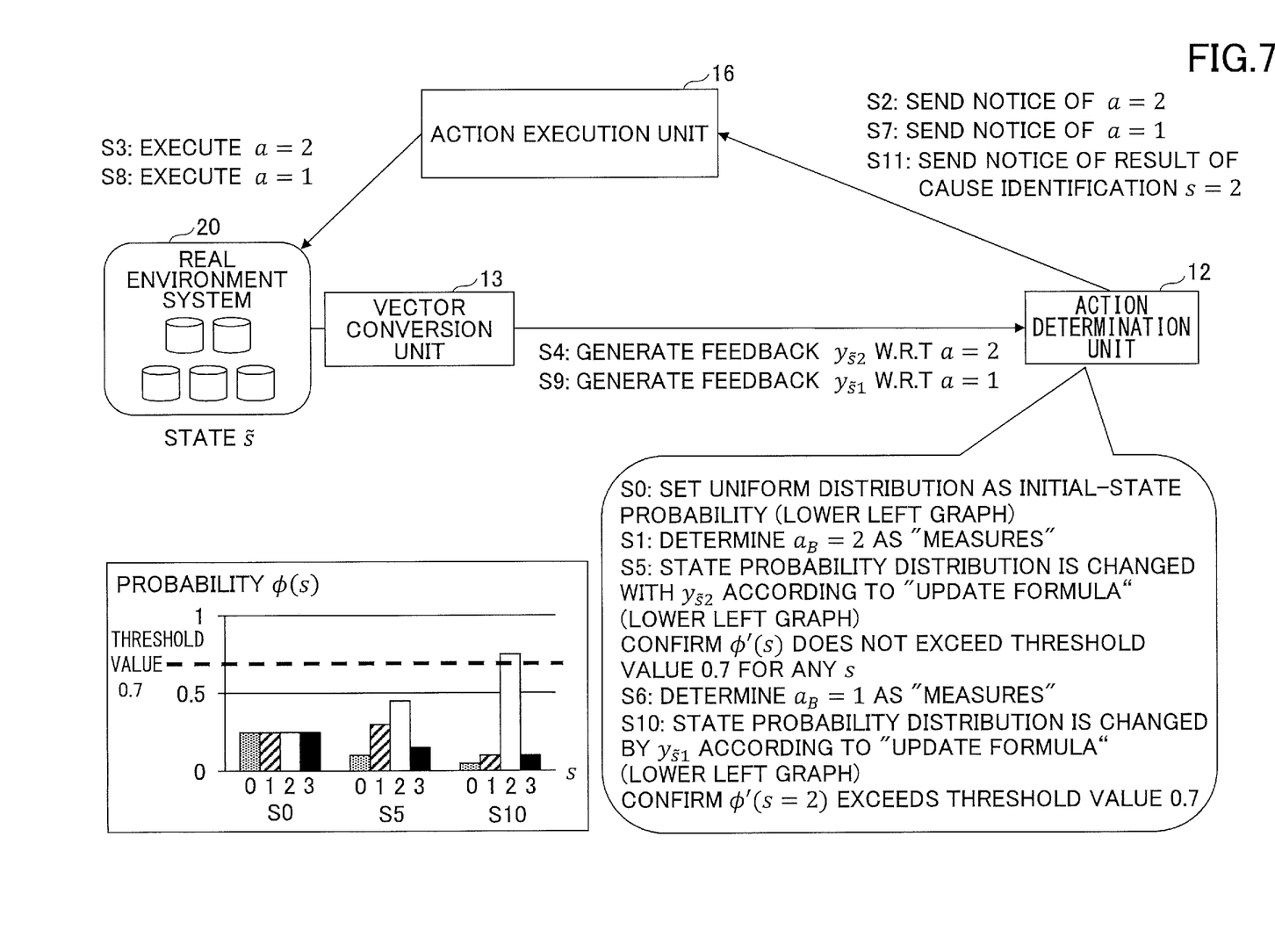
FIG. 7 is a diagram illustrating processing in an application example.

Next, the on-line cause identification will be described with reference to FIG. 7. The numbers attached to a character S(Step) ranging from S1 to S11 constitute a time series. Here, an example will be described in which in order to estimate the unknown state ~s, the loop of Steps 202 to 205 is executed twice, to finally output s=2 as the result of cause estimation. The threshold value at Step 205 is set to 0.7. In the following, the flow of cause identification will be described according to the specific example in FIG. 7.

First, triggered by a separate technique of anomaly detection or a user report, once the cause identification has been initiated, the action determination unit 12 sets the initial state probability φ(s) at S0. Here, consider a uniform distribution. This is illustrated as a graph (S0) in the lower left in FIG. 7, where values are set as φ(0)=φ(1)=φ(2)=φ(3)=0.25.

Next, suppose that the action determination unit 12 determines $a_B$=2 as an optimal action at S1 according to the "policy" generated based on the stochastic model $P_a(x|s)$. A notice of this may be sent to the action execution unit 16 at S2. This notice may be issued to the operator through the user interface 15.

At S3, the action execution unit 16 or the operator executes a=2 on the real environment system 20. Consequently, the real environment system 20 outputs an action log, which is obtained at S4 as the following feature vector via the vector conversion unit 13 (which may be provided with a function different from those used when generating a model if it is a unit that executes the same operations when generating the model):
[Formula 14]
$y_{\tilde{s}2}$
By inputting this feature vector,
[Formula 15]
$y_{\tilde{s}2}$
into the action determination unit 12 to calculate the "update formula", the action determination unit 12 obtains at S5 a new state probability distribution φ'(s). This is illustrated as a graph (S5) at the lower left in the figure. Here, φ(s) does not exceed the threshold value 0.7 for any s; therefore, the loop of cause identification returns to Step 202.

At S6, the action determination unit 12 determines $a_B$=1 by the "policy", issues a notice of this at S7, and at S8, the operator or the action execution unit 16 executes a=1 on the real environment system 20.

At S9, the real environment system 20 outputs an action log as the feedback with respect to a=1, and gives the following feature vector via the vector conversion unit 13:
[Formula 16] $y_{\tilde{s}1}$ Taking this vector as input, at S10, the action determination unit 12 updates the state probability distribution according to the "update formula". The updated state probability distribution φ'(s) is illustrated as a graph (S10) at the lower left in the figure. According to this graph, φ(s=2)≥0.7; therefore, the process exits the loop of the cause identification, and at S11, the action determination unit 12 outputs s=2 as the result of cause estimation, to end the operations of the cause estimation.

Effects of Embodiment

According to the present embodiment, for failures that have been difficult to be isolated conventionally due to no differences found in the monitoring logs alone, effective user actions are selectively executed to narrow down candidates of the cause by using the action logs generated upon the execution, and thereby, it becomes possible to identify the cause faster and safer than with the conventional techniques, without depending on the knowledge and experiences of the operator.

In other words, in a cause identification system using user actions, when identifying the cause of a failure, it becomes possible to execute appropriate actions in an appropriate order. In particular, the present techniques can be applied even to a log that is difficult to handle numerically as it is, such as an action log obtained as feedback from a real environment system in response to a user action. With the present techniques, in the cause identification system using user actions, it becomes possible to identify causes faster while reducing the load posed on a real environment system.

Summary of Embodiment

As described above, according to the present embodiment, a system state estimation apparatus to estimate a system state in a system that outputs log data upon executing a user action is provided, which includes a model generation unit configured to use log data accumulated in advance, to generate a stochastic model in which a system state and a user action are associated with log data when the user action is executed in the system state; and an action determination unit configured to determine a user action that contributes to identification of the system state in the system, based on a probability distribution of the system state and the stochastic model.

The action determination unit collects, for example, log data output from the system that has executed the determined user action, updates the probability distribution based on the log data, and based on the updated probability distribution and the stochastic model, repeatedly executes a process of determining a user action that contributes to the identification of the system state in the system, until the system state in the system is identified.

The action determination unit may identify, in response to a probability of a certain system state exceeding a threshold value in the repeatedly executed process, the certain system state as the system state of the system.

The action determination unit may determine a user action that minimizes entropy of the probability distribution of the system state, as the user action that contributes to the identification of the system state.

As above, the embodiment has been described. Note that the present invention is not limited to such a specific embodiment, and various modifications and alterations can be made within the scope of the subject matters of the present invention described in the claims.

The present patent application claims priority based on Japanese Patent Application No. 2018-113872, filed on Jun. 14, 2018, and the entire contents of Japanese Patent Application No. 2018-113872 are incorporated herein by reference.

LIST OF REFERENCE SYMBOLS 10 failure cause estimation device
11 model generation unit
12 action determination unit
13, 14 vector conversion unit
15 user interface
16 action execution unit
20 real environment system
30 training data accumulation unit
150 drive device
151 recording medium
152 auxiliary storage device
153 memory device
154 CPU
155 interface device
156 display device
157 input device

The invention claimed is:

1. A system state estimation apparatus to estimate a system state in a real environment system that outputs log data upon executing a user action, the system state estimation apparatus comprising:
a memory; and
a processor configured to:
acquire, from a database, training data that comprises prior data output by the real environment system from prior actions performed by one or more user instructions under different system failure conditions;
generate a set of prior feature vectors that represent the acquired training data, wherein each prior feature vector of the set of prior feature vectors comprises one or more prior user actions and one or more prior corresponding system states;
train, using the generated set of prior feature vectors, a stochastic model that generates a likelihood of systems states, wherein the stochastic model represents a likelihood of which feature vectors occur in response to one or more respective user actions being taken upon certain system failures;
generate, in a cloud computing environment, a simulation that models narrowing candidate causes of a system failure to reduce processing load on the system and to isolate a final cause of system failure by predicting a number of user actions required to be executed to determine the final cause of the system failure using the trained stochastic model, the simulation being configured to:
determine, from among a plurality of user actions, a user action that is most likely to reduce the plurality of user actions that caused an unknown system state using (i) the trained stochastic model and (ii) a probability distribution that defines probabilities of different system states being the unknown system state;
execute the determined user action on the real environment system;
in response to executing the determined user action, obtain, from the real environment system, feedback data that includes results of the determined user action on the real environment system, wherein the feedback data includes non-binary data;
update the probability distribution based on the obtained feedback data including the non-binary data; and
determine, based on the updated probability distribution, whether any of the different system states has a probability that meets a threshold value;
repeat the narrowing of the candidate causes of the system failure in the simulation until a determination is made that at least one of the different system states has the probability that meets the threshold value, wherein repeating of the narrowing simulation is performed using the updated probability distribution and the trained stochastic model and wherein repeating of the narrowing simulation comprises excluding previously executed user actions from the plurality of user actions;
in response to determining that a particular system state among the different system states has the probability that meets the threshold value, terminate the repeated simulation; and
output the particular system state from the simulation as the unknown state to a user interface.

2. The system state estimation apparatus of claim 1, wherein the processor is configured to determine the respective user action that minimizes entropy of the probability distribution of the unknown system state.

3. The system state estimation apparatus of claim 1, wherein the processor is configured to determine the respective user action that maximizes a value obtained by inputting a candidate system states and the respective user action into a function determined by Q-learning, as the respective user action that contributes to the unknown system state.

4. A system state estimation method executed by a system state estimation apparatus to estimate a system state in a system that outputs log data upon executing a user action, the system state estimation method comprising:
acquiring, from a database, training data that comprises prior data output by a real environment system from prior actions performed by one or more user instructions under different system failure conditions;
generating a set of prior feature vectors that represent the acquired training data, wherein each prior feature vector of the set of prior feature vectors comprises one or more prior user actions and one or more prior corresponding system states;
training, using the generated set of prior feature vectors, a stochastic model that generates a likelihood of systems states, wherein the stochastic model represents a likelihood of which feature vectors occur in response to one or more respective user actions being taken upon certain system failures;
generating, in a cloud computing environment, a simulation that models narrowing candidate causes of a system failure to reduce processing load on the system and to isolate a final cause of system failure by predicting a number of user actions required to be executed to determine the final cause of the system failure using the trained stochastic model, the simulation being configured to:

determining, from among a plurality of user actions, a user action that is most likely to reduce the plurality of user actions that caused an unknown system state using (i) the trained stochastic model and (ii) a probability distribution that defines probabilities of different system states being the unknown system state;

executing the determined user action on the real environment system;

in response to executing the determined user action, obtaining, from the real environment system, feedback data that includes results of the determined user action on the real environment system, wherein the feedback data includes non-binary data;

updating the probability distribution based on the obtained feedback data including the non-binary data; and determining, based on the updated probability distribution, whether any of the different system states has a probability that meets a threshold value;

repeating the narrowing of the candidate causes of the system failure in the simulation until a determination is made that at least one of the different system states has the probability that meets the threshold value, wherein repeating of the narrowing simulation is performed using the updated probability distribution and the trained stochastic model and wherein repeating of the narrowing simulation comprises excluding previously executed user actions from the plurality of user actions;

in response to determining that a particular system state among the different system states has the probability that meets the threshold value, terminate the narrowing of the repeated simulations; and outputting the particular system state from the simulation as the unknown state to a user interface.

5. A non-transitory computer-readable recording medium having computer-readable instructions stored thereon, which when executed, causes a computer to execute a process of system state estimation, the process comprising:

acquiring, from a database, training data that comprises prior data output by a real environment system from prior actions performed by one or more user instructions under different system failure conditions;

generating a set of prior feature vectors that represent the acquired training data, wherein each prior feature vector of the set of prior feature vectors comprises one or more prior user actions and one or more prior corresponding system states;

training, using the generated set of prior feature vectors, a stochastic model that generates a likelihood of systems states, wherein the stochastic model represents a likelihood of which feature vectors occur in response to one or more respective user actions being taken upon certain system failures;

generating, in a cloud computing environment, a simulation that models narrowing candidate causes of a system failure to reduce processing load on the system and to isolate a final cause of system failure by predicting a number of user actions required to be executed to determine the final cause of the system failure using the trained stochastic model, the simulation being configured to:

determining, from among a plurality of user actions, a user action that is most likely to reduce the plurality of user actions that caused an unknown system state using (i) the trained stochastic model and (ii) a probability distribution that defines probabilities of different system states being the unknown system state;

executing the determined user action on the real environment system;

in response to executing the determined user action, obtaining, from the real environment system, feedback data that includes results of the determined user action on the real environment system, wherein the feedback data includes non-binary data;

updating the probability distribution based on the obtained feedback data including the non-binary data; and  determining, based on the updated probability distribution, whether any of the different system states has a probability that meets a threshold value;

repeating the narrowing of the candidate causes of the system failure in the simulation until a determination is made that at least one of the different system states has the probability that meets the threshold value, wherein repeating of the narrowing simulation is performed using the updated probability distribution and the trained stochastic model and wherein repeating of the narrowing simulation comprises excluding previously executed user actions from the plurality of user actions;

in response to determining that a particular system state among the different system states has the probability that meets the threshold value, terminate the narrowing of the repeated simulations; and  outputting the particular system state from the simulation as the unknown state to a user interface.

\* \* \* \* \*